(12) United States Patent
Chen

(10) Patent No.: US 6,504,885 B1
(45) Date of Patent: ***Jan. 7, 2003

(54) SYSTEM AND METHOD FOR MODELING MIXED SIGNAL RF CIRCUITS IN A DIGITAL SIGNAL ENVIRONMENT

(75) Inventor: Jesse E. Chen, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 09/659,854

(22) Filed: Sep. 12, 2000

Related U.S. Application Data

(63) Continuation of application No. 09/096,555, filed on Jun. 12, 1998, now Pat. No. 6,181,754.

(51) Int. Cl.$^7$ ................................................. H04B 1/10
(52) U.S. Cl. ...................................... 375/350; 375/325
(58) Field of Search ................................ 375/350, 325, 375/316

(56) References Cited

U.S. PATENT DOCUMENTS

| | | | | |
|---|---|---|---|---|
| 4,432,009 A | * | 2/1984 | Reitmeier et al. | 348/580 |
| 5,878,089 A | * | 3/1999 | Dapper et al. | 375/325 |

OTHER PUBLICATIONS

H.B. Poza, et al., *A Wideband Data Link Computer Simulation Model*, Proc. NAECON Conf., 1975, pp. 71–78.

A.A. Saleh, *Frequency–Independent and Frequency–Dependent Nonlinear Models of TWT Amplifiers*, IEEE Trans. Commu., vol. COM29, No. 11, Nov. 1981, pp. 1715–1720.

R. Blum, et al., *Modeling Nonlinear Amplifiers for Communication Simulation*, Conference Record, IEEE Intern. Conf. On Commu., ICC '89, Boston, MA, Jun. 1989, pp. 1468–1472.

\* cited by examiner

*Primary Examiner*—Chi Pham
*Assistant Examiner*—Kevin M Burd
(74) *Attorney, Agent, or Firm*—Bingham McCutchen LLP

(57) ABSTRACT

A behavioral model for mixed signal RF circuits. The model approximates non-linear filtering effects for base-band (i.e. suppressed carrier) end-to-end systems analysis. The new model, the K-model, is a linear MIMO (multi-input-multi-output) model with output radius corrected by a non-linear SISO (single-input-single output) model and output angle corrected by a non-linear rotation. The SISO model uses a multi-tanh structure to synthesize a non-linear filter. The multi-tanh structure simulates non-linear behavior by gently switching between transfer functions as the base-band input varies. For excursions well into the steady state non-linear region of operation the K-model simulates large-signal base-band transients to within about 10 percent of those simulated with detailed unsuppressed-carrier models.

19 Claims, 18 Drawing Sheets

$$dx/dr = \Sigma\,[g(r-r_k)\,dx(r_k)/dr]\text{, and}$$
$$g(r-r_k) = (\text{sech}[(r-r_k)/c])^2$$
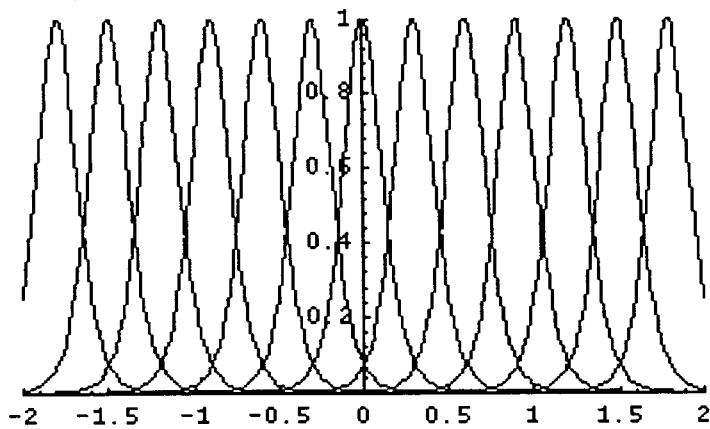
Integrate with respect to r
$(c)\tanh[(r-r_k)/c]$
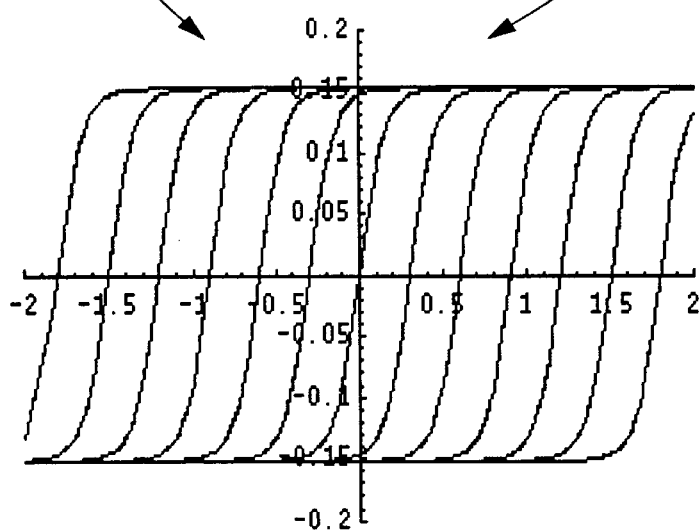
$$x(r) = \Sigma\,[(c)\tanh[(r-r_k)/c]\,dx_k/dr\,]\quad(1)$$
Figure 2

*$K_{ij}$ is a linear filter. The overall filter does not rotate the input vector at zero frequency.*

$$I_{out}(t) = K_{11}(t) * I_{in}(t) + K_{12}(t) * Q_{in}(t)$$

$$Q_{out}(t) = K_{21}(t) * I_{in}(t) + K_{22}(t) * Q_{in}(t)$$

$h_k$ is a linear filter impulse response and $h_{-j}=h_j$.

Small in-band signals, no distortion
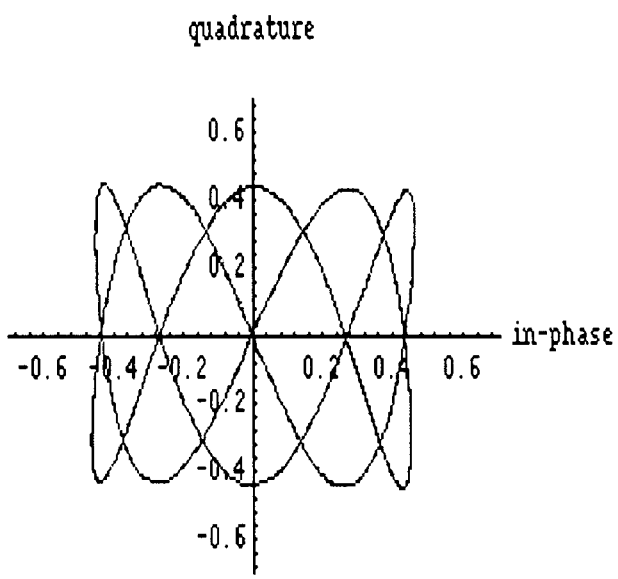
Figure 9a,
1.3v peak each, 10Mhz, 25Mhz, dotted=spectreRF, solid=k-model, 1
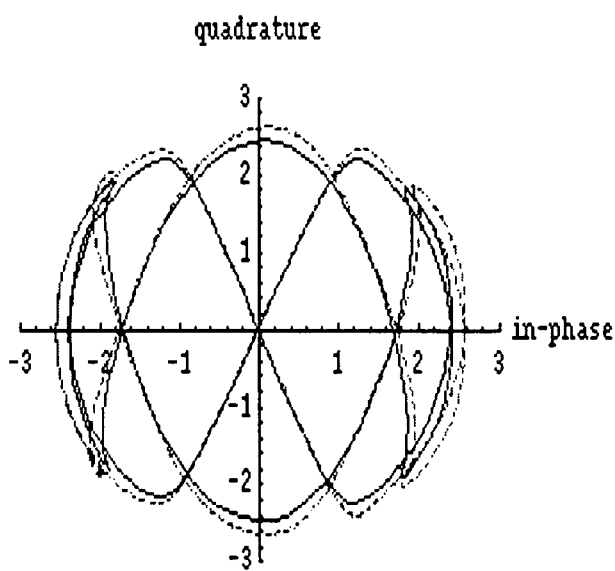
Figure 9b,

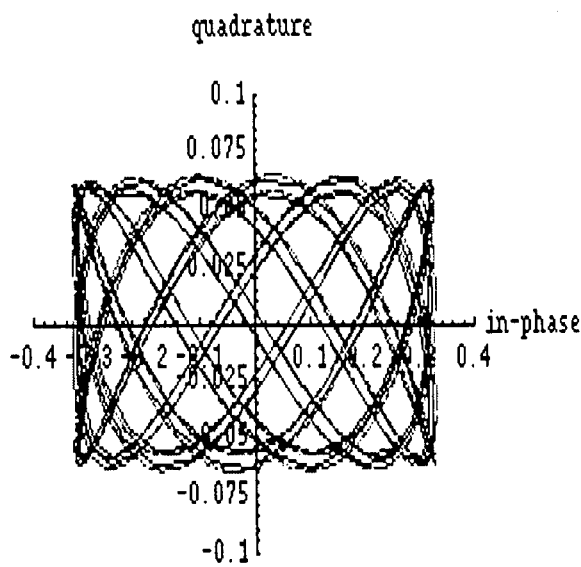
Figure 10a,
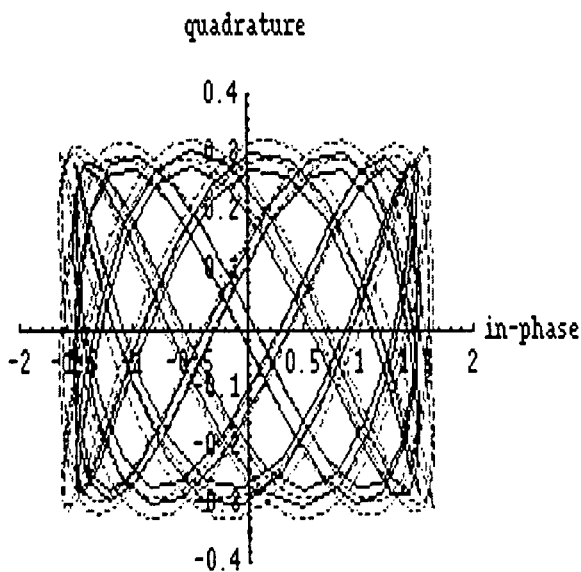
Figure 10b,

SYSTEM AND METHOD FOR MODELING MIXED SIGNAL RF CIRCUITS IN A DIGITAL SIGNAL ENVIRONMENT

RELATED APPLICATION INFORMATION

This application is a continuation of U.S. application Ser. No. 09/096,555, filed on Jun. 12, 1998, now U.S. Pat. No. 6,181,754 and hereby incorporated by reference as if set forth fully herein.

BACKGROUND OF THE INVENTION

1. Field of the Invention

The present invention relates to the field of circuit simulation and more particularly to modeling mixed signal radio frequency (RF) circuits in a digital signal or mixed signal environment.

2. Description of Background Art

Modern communications systems are digital in nature but they require some analog circuitry. Unlike data traveling over traces on a chip, data traveling between geographically different locations must ride on "carriers" that propagate over cables, air, or space. Carriers are electromagnetic AC signals with frequencies suited for propagation over long distances. The transmitter encodes blocks of digital data into "base-band" analog signals which then modulate a carrier. The carrier frequency is much higher than the maximum base-band frequency. Modulation and transmission require analog circuitry. On the receiver end, analog circuitry amplifies and demodulates the carrier to recover the base-band signal. Analog circuitry is a crucial part of a communications link but does not always work perfectly. Analog circuitry on either end can distort the signal. Various analog and digital signal processing (DSP) techniques reduce and correct distortion. Each technique has benefits and costs relative to the system at hand. The optimal balance of DSP and analog expense is usually not obvious and hardware iterations cost a lot. The means to simulate DSP algorithms and analog circuitry together can reduce the number of hardware iterations by exposing-problems early.

Ideally one would simulate DSP and analog subsystems together with the analog system modeled in detail. But should one use a DSP simulator or an analog simulator? The purely analog approach leads to impractical run times and requires cumbersome analog models of DSP algorithms. Since DSP simulators cannot solve analog non-linear differential equations, simulating the analog subsystem in detail requires DSP and analog simulators running in parallel. The parallel simulator approach is called "co-simulation". The problem with co-simulation is that DSP algorithms operate on the base-band signals while the analog circuit operates on the carrier. The wide difference between carrier and base-band time scales makes co-simulation extremely slow at best. There is another problem with co-simulation: the necessary detailed analog models reveal design secrets. Although vendors of analog intellectual property (IP) would like to supply models to potential customers they do not want to expose their IP to competitors.

The most practical alternative to co-simulation is to model the analog circuitry for a DSP simulator. The challenge is to capture the relevant base-band distortion in a behavioral model that is easy to extract and implement. An extra benefit of behavioral models is that they simulate behavior without revealing design secrets. With respect to conventional systems, "relevant base-band distortion" refers to linear distortion, uniform gain compression, frequency-dependent gain compression, and AM-PM conversion. The last three distortions are non-linear behaviors.

The relevant linear distortion is due to dynamics, the circuit's dependence on input history. Models described by linear differential/integral equations are dynamic. In contrast, a model described by time-invariant algebraic equations is static: the present output depends only on the present input; there is no dependence on input history; the model has no memory. Typical symptoms of linear distortion are dispersion (group delay) and intersymbol interference, things associated with a low pass filter.

Uniform gain compression refers to a loss of small signal gain when the input has a large DC offset (a large bias). Here, "uniform" implies the gain drops by the same percentage regardless of the frequency of an input sinusoidal perturbation. In contrast, "frequency-dependent gain compression" refers to gain compression that varies with perturbation frequency; gain loss still increases with increasing input bias but the loss is not uniform.

AM-PM conversion refers to a phase modulation (PM) of the output caused by an amplitude modulation of the input; the phase of the base-band output varies with the amplitude of the input carrier.

What is needed is a modeling system for a mixed signal RF circuit in a DSP or mixed signal environment that (1) captures gain compression and static am-pm conversion, (2) captures linear distortion, (3) captures frequency-dependent gain compression and (4) is easy to extract and implement.

SUMMARY OF THE INVENTION

The invention is a system and method for a behavioral model for mixed signal RF circuits. The model approximates non-linear filtering effects for base-band (i.e. suppressed carrier) end-to-end systems analysis. The new model, the K-model, is a linear MIMO (multi-input-multi-output) model with output radius corrected by a non-linear SISO (single-input-single output) model and output angle corrected by a non-linear rotation. The non-linear SISO model uses a multi-tanh structure to synthesize a non-linear filter. The multi-tanh structure simulates non-linear behavior by gently switching between transfer functions as the base-band input varies. For excursions well into the steady state non-linear region of operation the K-model simulates large-signal base-band transients to within about 10 percent of those simulated with detailed unsuppressed-carrier models

BRIEF DESCRIPTION OF THE DRAWINGS

FIG. 2 is a graphical and mathematical description of a portion of the operation of the non-linear SISO model according to one embodiment of the present invention.

FIGS. 9a and 9b are illustrations comparing I–Q output trajectories for small and large in-band signals using SpectreRF model and the K-model of the present invention.

FIGS. 10a and 10b are illustrations of the trajectories for small and large signals at higher frequencies according to the present invention.

DETAILED DESCRIPTION OF THE PREFERRED EMBODIMENTS

Figure 1:
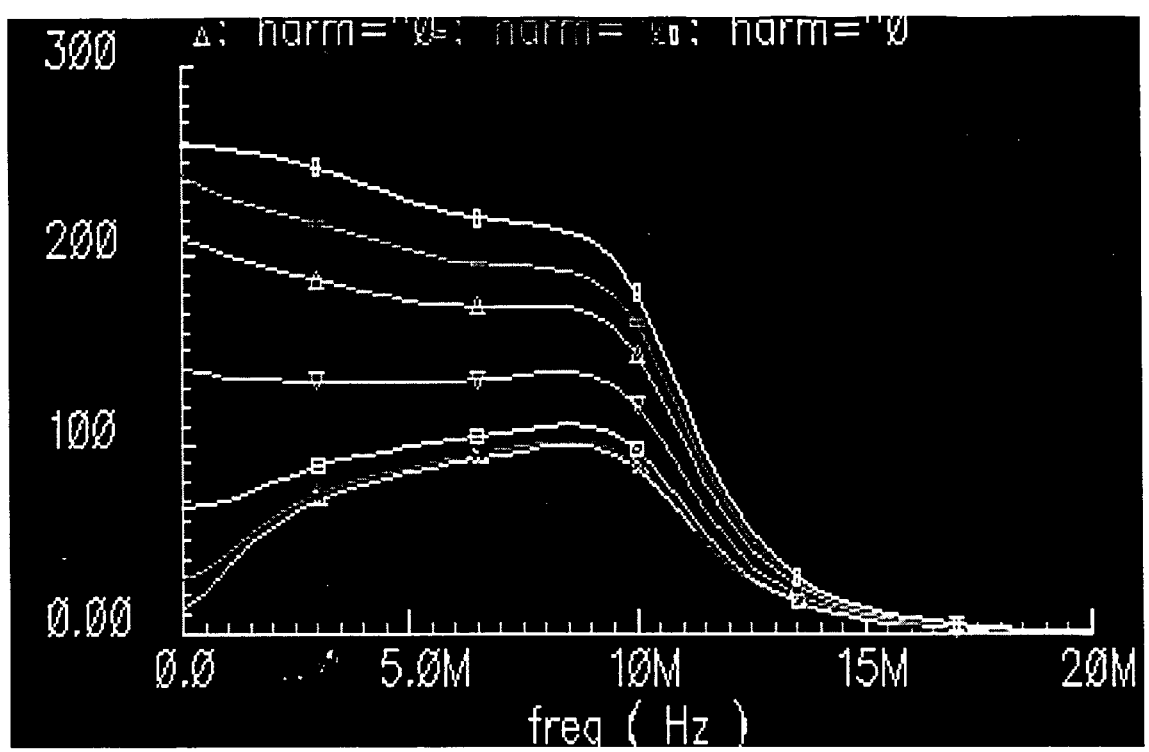
FIG. 1 is an illustration of a set of transfer functions for an RF receiver.

A preferred embodiment of the present invention is now described with reference to the figures where like reference numbers indicate identical or functionally similar elements. Also in the figures, the left most digit of each reference number corresponds to the figure in which the reference number is first used.

Wireless receivers have analog circuitry between the antenna and digital signal processing (DSP) components and algorithms. The analog front end can introduce linear and non-linear distortion. Matched filters, encoders, and equalizers hopefully mitigate noise and distortion. The optimal balance of digital and analog complexity is not always obvious or easily specified. The only thing obvious is that "optimal" is defined in an end-to-end context. This paper describes a way to model the entire analog front end for analysis in a DSP design environment. One objective is to see if an existing analog front end design will work in the end-to-end system.

There are at least four kinds of behavioral models: linear models, as described in Crols and Steyaert, *CMOS Wireless Transceiver Design*, Kluwer Academic Publishers, 1997 which is incorporated by reference herein in its entirety, for example, static non-linear models as described in Struble et al., *Understanding Linearity in Wireless Communications Amplifiers*, IEEE Journal of Solid-State Circuits, September, 1997 which is incorporated by reference herein in its entirety, for example, cascaded models that are described in greater detail herein, and models based on the Volterra series as described in Schetzen, *The Volterra & Wiener Theories of Non-Linear Systems*, Krieger Publishing Company, 1980 which is incorporated by reference herein in its entirety, for example. Linear models simulate linear distortion over a small range of input amplitudes. A lone linear model does not exhibit gain compression. Static models scale and rotate the complex base-band input signal to generate base-band output. The complex plane is a convenient space for representing base-band signals because one carrier has two phases and each phase can be modulated independently. If the degree of scaling and rotation depends on the magnitude of the input base-band signal, the static model is non-linear. Static non-linear models capture uniform gain compression and static am-pm conversion but not linear distortion. One fairly obvious thing to do is to cascade a static non-linear model with a single linear model. "Single linear model" means all outputs have similar impulse responses, i.e., all transfer functions have common poles. The cascaded model produces linear distortion, gain compression, and am-pm conversion but not frequency-dependent gain compression.

In addition to the effects mentioned above, the K-model also simulates frequency-dependent gain compression. The key elements of the K-model are a set of linear filters and a set of hyperbolic tangent functions. The K-model drives the linear filters with a multi-tanh structure as described in Gilbert, *The Multi-tanh Principle: A Tutorial Overview*, IEEE Journal of Solid-State Circuits, January 1998 which is incorporated by reference herein in its entirety, for example. The multi-tanh structure was originally developed to synthesize static non-linear functions using transistor circuits. The multi-tanh structure in Gilbert, *The Multi-tanh Principle: A Tutorial Overview*, IEEE Journal of Solid-State Circuits, January 1998 was not developed as general method for modeling linear and non-linear distortion of complex signals.

Models based on the Volterra series capture all the effects above but require multi-dimensional convolution. The kernels of such convolutions are hard to extract and the integrals are hard to implement. The K-model uses only one-dimensional convolutions because its dynamics come from a set of linear models. One-dimensional convolutions are far easier to implement than multi-dimensional convolutions. The general Wiener model and Gate model, that are described in Schetzen, *The Volterra & Wiener Theories of Non-Linear Systems*, Krieger Publishing Company, 1980 and referenced above, are variations of the Volterra series expansion. They use cascaded one-dimensional convolutions. However, the Wiener and Gate models are still harder to extract and implement than the K-model.

Communications systems engineers primarily use data flow simulators. When a data flow model executes, it receives inputs, generates output, then awaits the next complete set of fresh inputs. Data flow through the system determines when each model executes. The only possible "convergence" problem occurs when a feedback loop has no delay. The only notion of time comes from the sample rate. DSP algorithms typically operate only on the information impressed on the RF carrier. Consequently, data flow models usually suppress RF carriers. Complex variables represent RF signals. The real part represents the amplitude of the "in-phase" component of the carrier and the imaginary part represents the amplitude of the quadrature component. For example if rf(t) is the instantaneous RF signal and $$rf(t)=a(t)\cos(w_c t)-b(t)\sin(w_c t) \qquad \text{Eq. (1)}$$

where $w_c$ is the carrier frequency, then the base-band representation is a(t)+jb(t) where $$rf(t)=Re[a(t)+jb(t))\exp(jw_c t)] \qquad \text{Eq. (2)}$$

Non-linear models of RF circuits are not new. It is relatively easy to fit a polynomial to an analytic function.

Common terms like "IP3" and "IP2", which measure intermodulation distortion, are based on polynomial models as described in Ha, *Solid-State Microwave Amplifier Design*, Krieger Publishing Company, 1991 which is incorporated by reference herein in its entirety. Another approach is to measure the complex gain at several signal levels then interpolate on-the-fly to vary the gain with input signals as described in Struble et al., *Understanding Linearity in Wireless Communications Amplifiers*, IEEE Journal of Solid-State Circuits, September, 1997 which has been incorporated by reference above. Here, gain is defined as a ratio of output to input, not the ratio of incremental output to incremental input. One disadvantage of these first two models is that they do not filter the base-band signal—the present output depends only on the present input. Such models have no memory and no filtering effects. Filtering effects make intermodulation distortion dependent on bit rate as described in Heutmaker et. al, *Using Digital Modulation to Measure and Model RF Amplifier Distortion*, Applied Microwave and Wireless, March/April 1997 which is incorporated by reference herein in its entirety.

Memory can be introduced by cascading a memoryless non-linear model with a linear filter. However, the cascade model does not capture amplitude-dependent poles and zeroes. FIG. 1 is an illustration of a set of transfer functions for an RF receiver. Each transfer function corresponds to a different input signal bias. "Bias" is the amplitude of the unmodulated carrier. The transfer functions are defined in terms of incremental quantities. A transfer function describes the small signal base-band response to small signal perturbations in the amplitude of the input RF carrier. Pole/zero movement is evident because gain compression depends on frequency.

Previous work on behavioral models with memory are based on the Volterra series as described in Ha, *Solid-State Microwave Amplifier Design*, Krieger Publishing Company, 1991, Schetzen, *The Volterra & Wiener Theories of Non-Linear Systems*, Krieger Publishing Company, 1980, and Verbeyst and Bossche, VIOMAP, *the S-Parameter Equivalent for Weakly Nonlinear RF and Microwave Devices*, IEEE Transactions on Microwave Theory and Techniques, Vol. 42, No.12, December, 1994 which are all incorporated by reference herein in their entirety, for example. One application of the Volterra series is to derive a frequency-dependent expression for IP3. The Volterra series has at least three drawbacks when applied to time-domain simulation: (a) it is difficult to extract, (b) it does not always converge, and (c) it can be as computationally intensive as co-simulation. The Wiener model as described in Schetzen, *The Volterra & Wiener Theories of Non-Linear Systems*, Krieger Publishing Company, 1980 is similar to the Volterra series except the functionals in the expansion are orthogonal when driven by white Gaussian noise. Orthogonality circumvents some convergence problems associated with the Volterra series but does not substantially alleviate the difficulties with extraction or implementation. In contrast, the K-model of the present invention is a heuristic model and is much easier to extract and implement.

Figure 4:
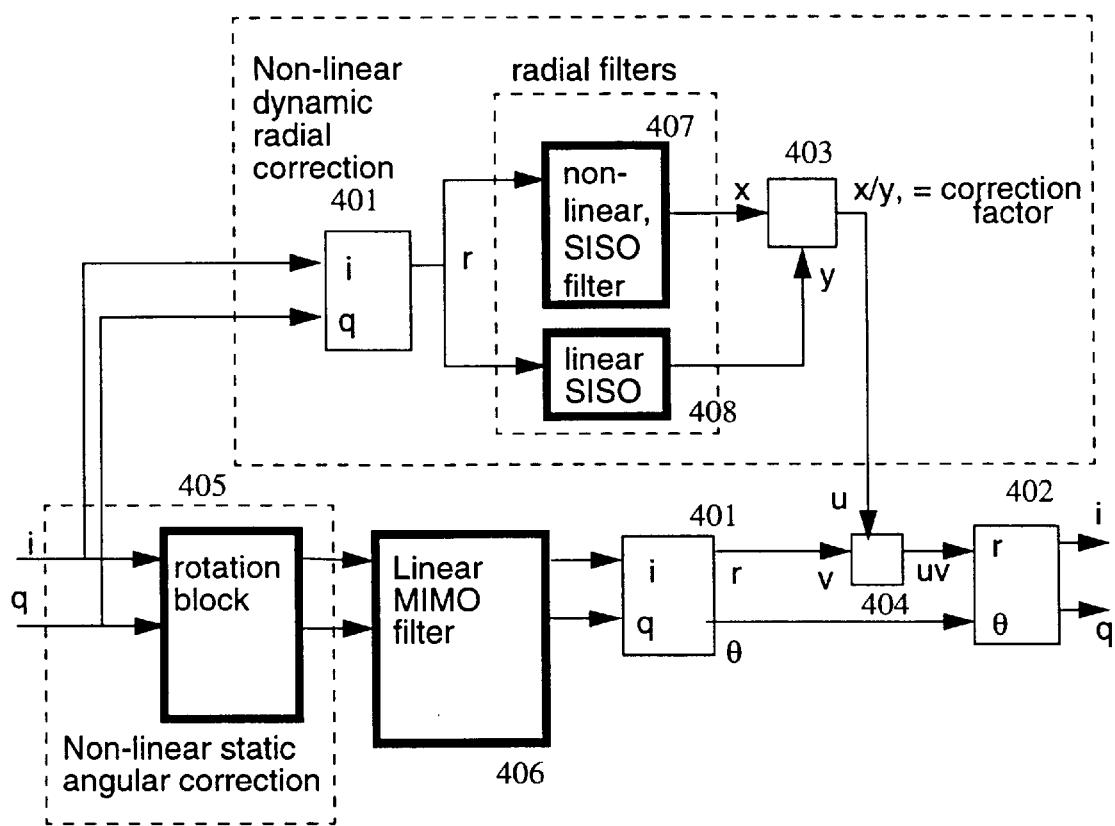
FIG. 4 is an illustration of the K-model according to a preferred embodiment of the present invention.

FIG. 4 is an illustration of the K-model according to a preferred embodiment of the present invention. The K-model consists of three main blocks: a non-linear SISO block 407, a linear MIMO block 406, and a rotation block 405. Each of these blocks are described in greater detail below.

The K-model includes a non-linear SISO model 407. The SISO model can be understood by first considering a memoryless non-linearity, $x(r)$. Instead of approximating $x(r)$ directly we start with $dx/dr$. We use fuzzy logic basis functions as described in Li-Xin Wang, *Adaptive Fuzzy Systems and Control Design and Stability Analysis*, pp. 49–52, PTR Prentice Hall, 1994 which is incorporated by reference herein in its entirety, for example, as a basis to interpolate between $dx/dr$ measurements, then integrate the basis functions with respect to x to obtain an approximation to $x(r)$ The integrated basis functions are tanh curves. The particular bases, $g(r)$, are somewhat arbitrary. FIG. 2 is a graphical and mathematical description of a portion of the operation of the non-linear SISO model according to one embodiment of the present invention.

Figure 3:
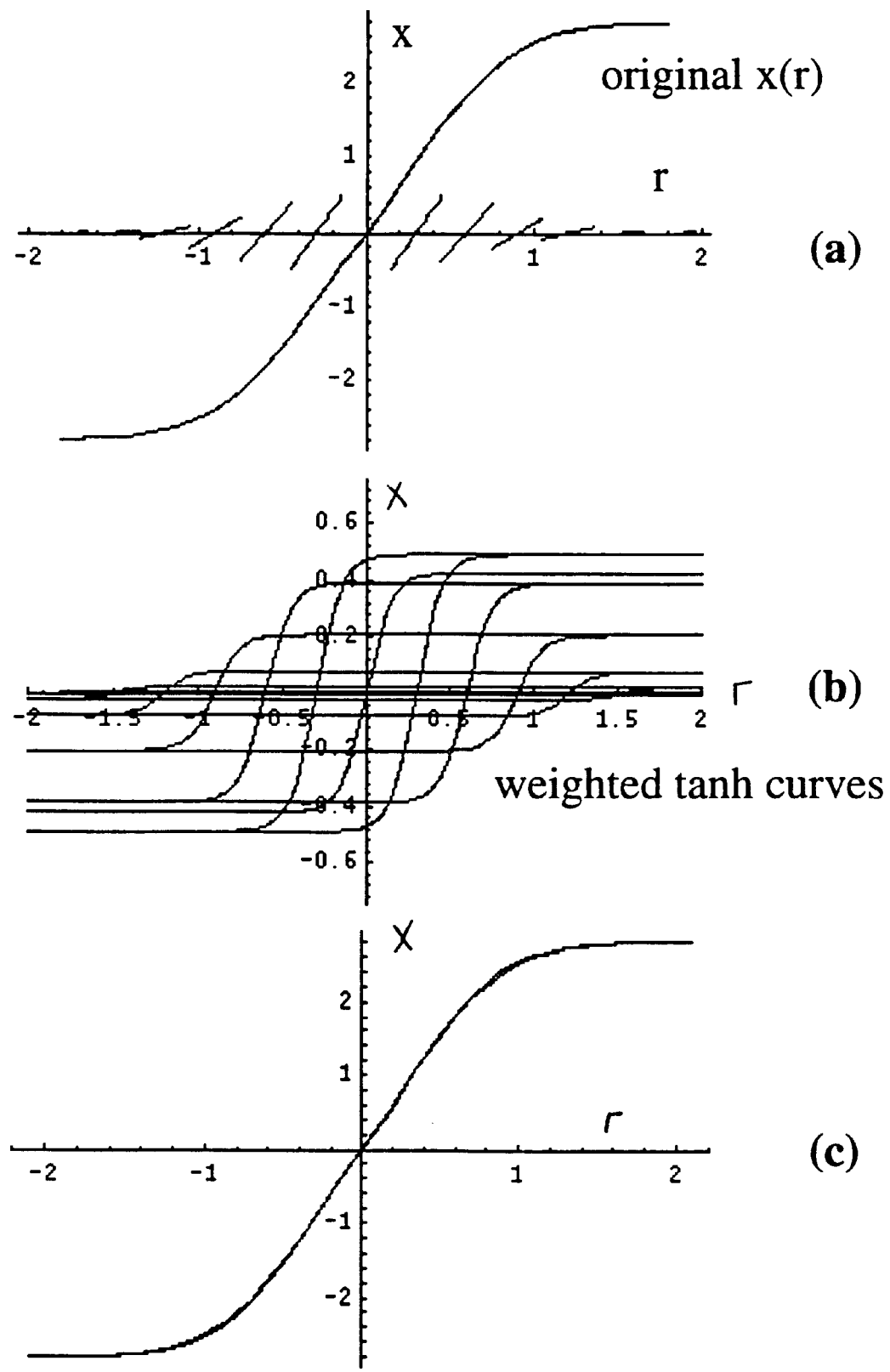
FIGS. 3(a)–(c) are graphical illustrations of the multi-tanh approximation procedure according to one embodiment of the present invention.

FIGS. 3(a)–(c) are graphical illustrations of the multi-tanh approximation procedure according to one embodiment of the present invention. FIG. 3(a) is the original non-linearity shown with short lines that represent slope measurements $dx(r_k)/dr$. FIG. 3(b) shows the weighted tanh curves. FIG. 3(c) shows the reconstructed $x(r)$, given by equation (3), along with the original $x(r)$. The error is barely noticeable.

$$x(r)=\Sigma[(c)\tan h[(r-r_k)/c]dx(r_k)/dr] \qquad \text{Eq. (3)}$$

The multi-tanh structure has been used to design programmable amplifiers as described in Gilbert, *The Multi-tanh Principle: A Tutorial Overview*, IEEE Journal of Solid-State Circuits, January 1998 which was incorporated by reference supra. The present invention uses this concept in the modeling arena. One approach is to synthesize a non-linear filter, i.e., a non-linear element that has memory, such that the filter's small signal transfer function matches that of the original system regardless of bias. The filter is non-linear because the transfer function changes with bias.

To synthesize a non-linear filter we replace the tangent slopes, $dx(rk)/dr$ in equation (3), with small signal transfer functions extracted at the appropriate bias–$h_k$ is extracted with the input biased to $r_k$.

The inverse Fourier transform of $k^{th}$ transfer function is the impulse response $hk(t)$. Multiplication of the slopes and tanh functions in equation (3) becomes convolution of the impulse responses with the tanh functions. Mathematically, $x(r)=$ $$\Sigma K=-N \text{ to } N \int h_k(\tau)(c)\tan h((r(t-\tau)-r_k)/c)d\tau \qquad \text{Eq. (4)}$$

where $2N+1$ is the number of tanh functions, k is the summation index, $\tau$ is the integration variable, $r_k$ is where the $k^{th}$ tanh function crosses zero, and c equals $r_N/(2N)$. The tanh curves gently switch between transfer functions as the base-band input signal varies.

One objective of the K-model is to simulate an RF front end in a DSP design environment. The DSP design environment works primarily with base-band representations of RF signals. As indicated above the base-band representation of an RF signal is a complex number. Complex numbers can be represented by rectangular coordinates (real and imaginary parts) or polar coordinates (radius and angle), for example. In either case the K-model of the preferred embodiment uses two inputs and two outputs. The linear MIMO filter 406 gives the K-model its basic filtering properties in a general rectangular fashion. Rectangular coordinates avoid the angular discontinuities caused by input trajectories crossing the negative real axis or diving through the origin. However, as described infra, non-linear behavior is more conveniently introduced in polar coordinates if one assumes the dominant non-linearity has polar symmetry.

The equations below describe a general linear relationship between two inputs and two outputs:

$$Yi(t)=K11(t)*Xi(t)+K12(t)*Xq(t) \quad \text{Eq. (5)}$$

$$Yq(t)=K21(t)*Xi(t)+K22(t)*Xq(t) \quad \text{Eq. (6)}$$

where "*" denotes time-domain convolution, X is the base-band input, and Y is the base-band output. The linear MIMO filter 406 described in this way is referred to as a complex filter in Crols and Steyaert, *CMOS Wireless Transceiver Design*, Kluwer Academic Publishers, 1997, referenced above. K11, K12, K21, and K22 are elements in a matrix that when post multiplied by the single column matrix [xi xq] results in the single column matrix [yi yq]. K11 is extracted by setting the RF carrier phase to zero, setting the signal bias to early zero, and measuring the small signal transfer function from modulation to "in-phase" base-band output, Yi. K21 can be extracted from the same simulation by measuring the transfer function to the "quadrature" output, Yq. K22 and K12 are extracted in the same manner but with the carrier phase set to 90 degrees.

The rotation block 405 captures static AM-PM conversion as described in Ha, *Solid-State Microwave Amplifier Design*, Krieger Publishing Company, 1991, for example. In contrast, the non-linear SISO block 407 captures AM-PM conversion due to pole zero movement. As the unmodulated input carrier amplitude increases, the receiver's output phase can change. In terms on the complex plane, as the input vector runs out along the positive real axis, the output vector runs radially outward at an angle. At larger input radii, that angle can depend on input radius. If the base-band signal is a+jb, the radius is equal to the square root of $[a^2+b^2]$.

The rotation block 405 rotates the input base-band vector according to steady state data taken at several input radii. The rotation is a static non-linear function of input radius. The next section describes the complete K-model.

In many RF receivers the dominant non-linearities depends only on input radius. As indicated above FIG. 4, is an illustration of the K-model according to a preferred embodiment of the present invention. The K-model operates on base-band input to compute base-band output. The K-model is a linear MIMO model with radial and rotational corrections that introduce non-linear behavior. Radial and rotational corrections both depend only on input radius.

To determine the radial correction the K-model determines the input radius then filters it with two SISO models, one linear 408 and one non-linear 407. Both SISO models operate on input radius and compute an output radius. The transfer function of the linear SISO model can be a copy of one of the transfer functions inside the non-linear SISO model. For example, it can be a copy of the transfer function extracted at the smallest bias. The radial correction factor is the ratio of the non-linear SISO model's output to the linear SISO model's output. When the input radius is small the correction factor is nearly one. When the input radius is large the correction factor is less than one, assuming the non-linearity stems from saturation.

To compute the rotational correction the K-model first reads tabular I and Q versus radius data and interpolates an I and Q depending on input radius. The model then rotates the input by arctan (Q/I) before the input reaches the linear MIMO filter 406. The K-model removes the DC rotation introduced by the linear MIMO filter 406 to avoid over-rotating the input. From an angular perspective the K-model is a cascade model, a static non-linearity followed by a linear filter. The non-linear phase correction enables the K-model to simulate phase-shifts that depend on input amplitude. The rest of this section explains each block in FIG. 4.

FIG. 4 also includes two rectangular-to-polar coordinate transformations units 401. One example of the operation performed by the rectangular-to-polar coordinate transformations units 401 is shown in equation (7).

$$r=Sqrt[i^2+q^2], \text{ and } q=ArcTan[q/i] \quad \text{Eq. (7)}$$

FIG. 4 also includes a polar-to-rectangular coordinate transformations unit 402. One example of the operation performed by the polar-to-rectangular coordinate transformation unit 402 is shown in equation (8).

$$i=r \cos(q), \text{ and } q=r \sin(q) \quad \text{Eq. (8)}$$

FIG. 4 also includes a signal divider 403. The output is equal to y/x (with y and x being received as inputs). This block checks for x=0 and outputs a set value, e.g., 1 in that event.

FIG. 4 also includes a multiplier 404, its output equals the product of its inputs.

Figure 4A:
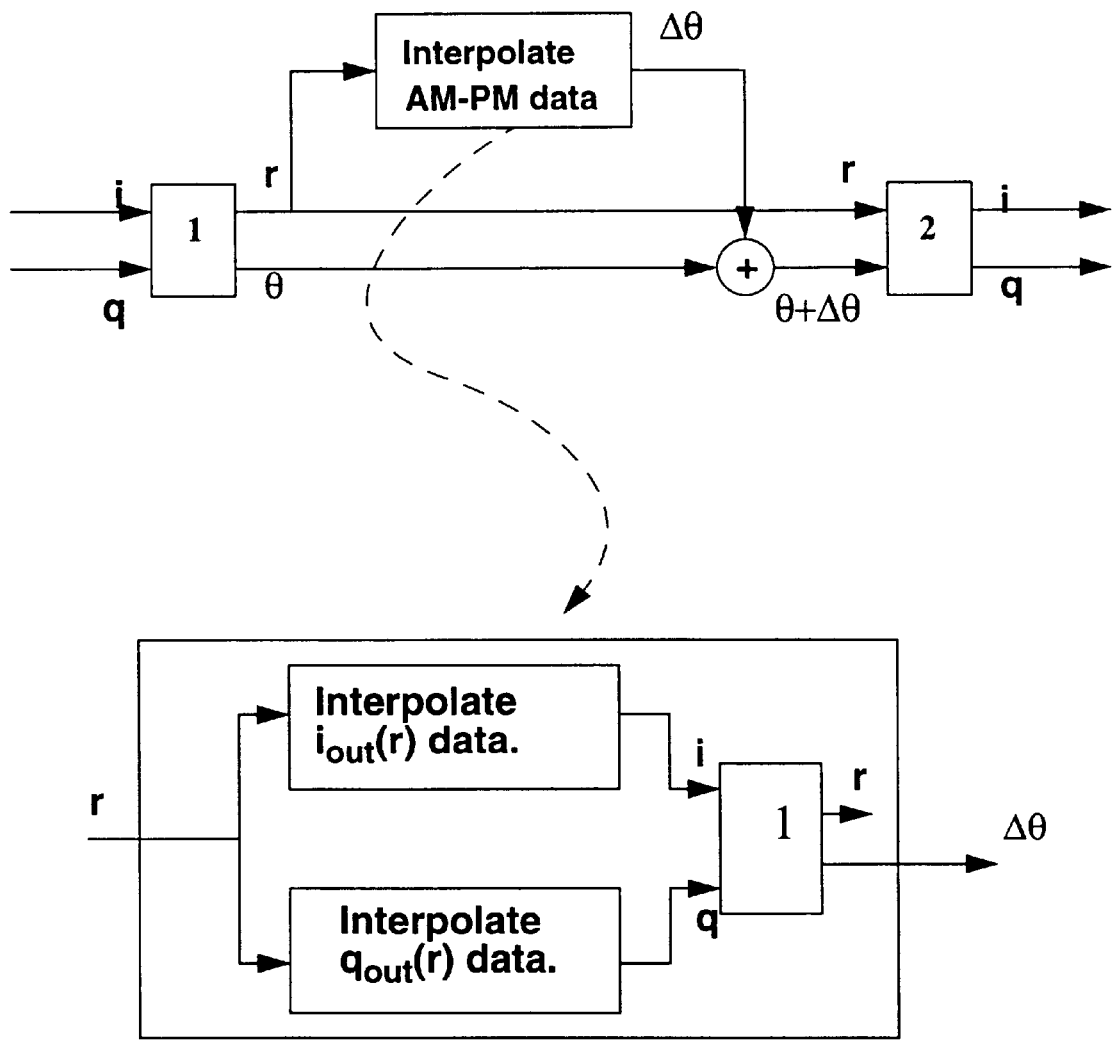
FIG. 4a is an illustration of a technique for implementing the rotation according to one embodiment of the present invention

FIG. 4 includes the rotation block 405 which performs a rotation operation in the complex plane. FIG. 4a is an illustration of a technique for implementing the rotation according to one embodiment of the present invention. The data for the interpolation process is steady state values of iout and qout resulting from several values of iin with qin=0. The implementation does not necessarily have to involve interpolation. One could use a closed form expression for the phase shift if it exists. The point is that Δθ is a non-linear function of r. One could also interchange the order of the rotation block 405 and the linear MIMO filter 406 to correct the phase after the linear block instead of before it. The rotation implemented-by the correction block 4055 corresponds to "θ(|ρ|)" in equation (2) of Struble et al., *Understanding Linearity in Wireless Communications Amplifiers*, IEEE Journal of Solid-State Circuits, September, *1997*, that was incorporated by reference above.

Figure 4B:
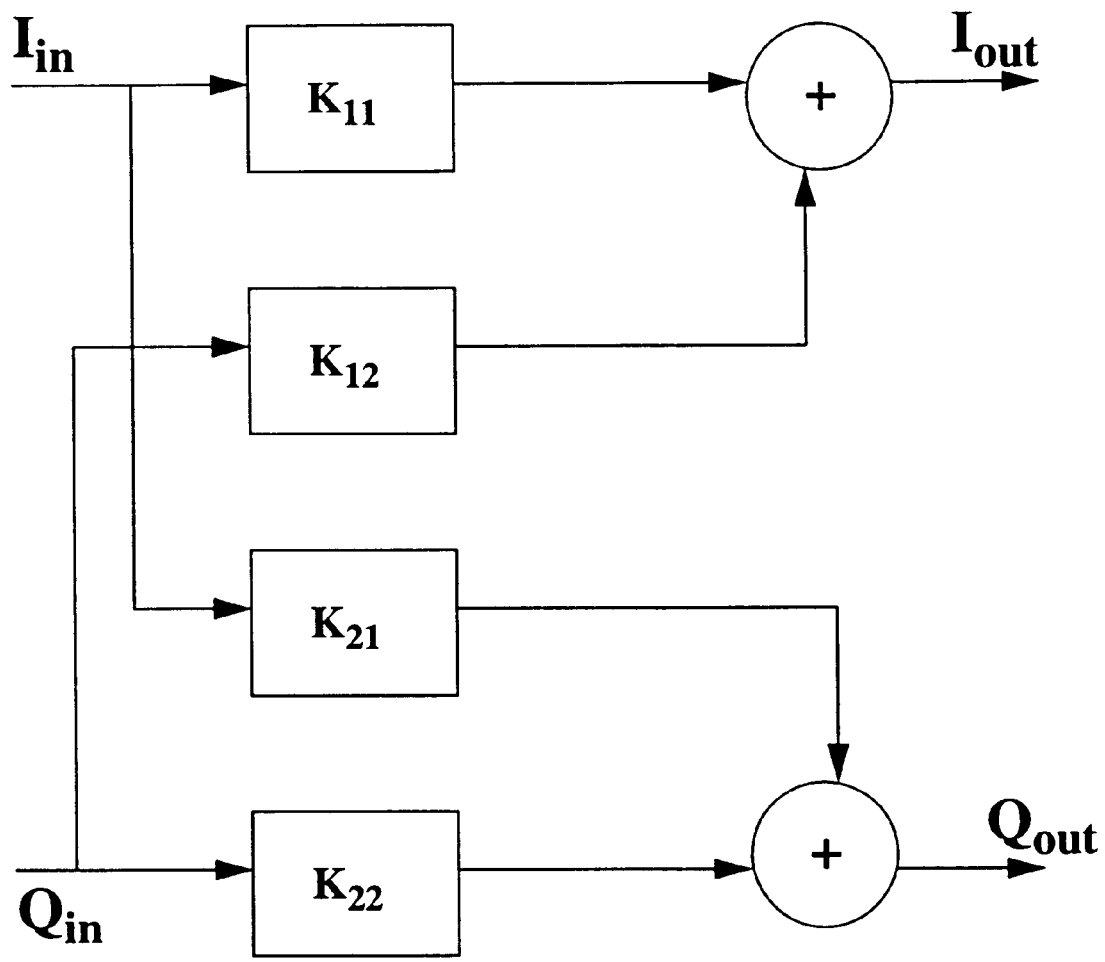
FIG. 4b is an illustration of the linear MIMO filter according to one embodiment of the present invention.

The linear MIMO filter 406 is a 2-input-2-output linear filter. FIG. 4b is an illustration of the linear MIMO filter according to one embodiment of the present invention.

Figure 4C:
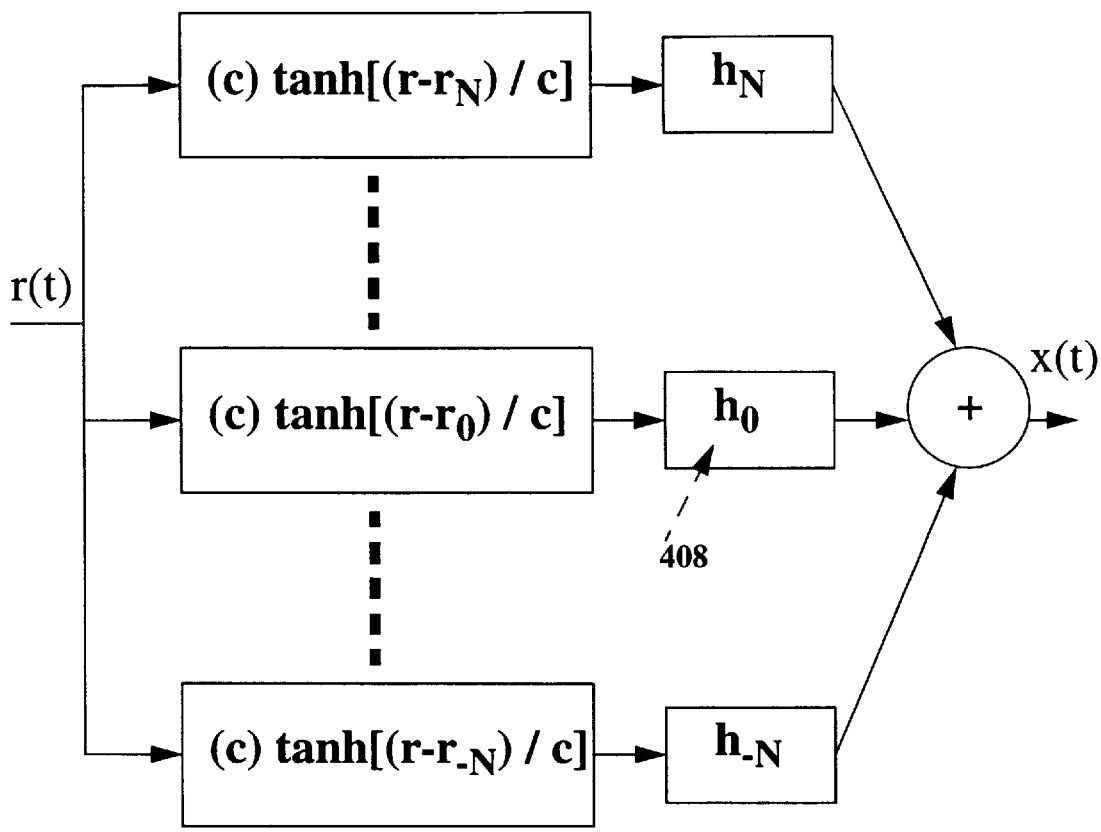
FIG. 4c is an illustration of one embodiment of the non-linear SISO filter.

FIG. 4c is an illustration of one embodiment of the non-linear SISO filter. As described above, the non-linear SISO filter 407 determines the value for x(r(t)).

Figure 4D:
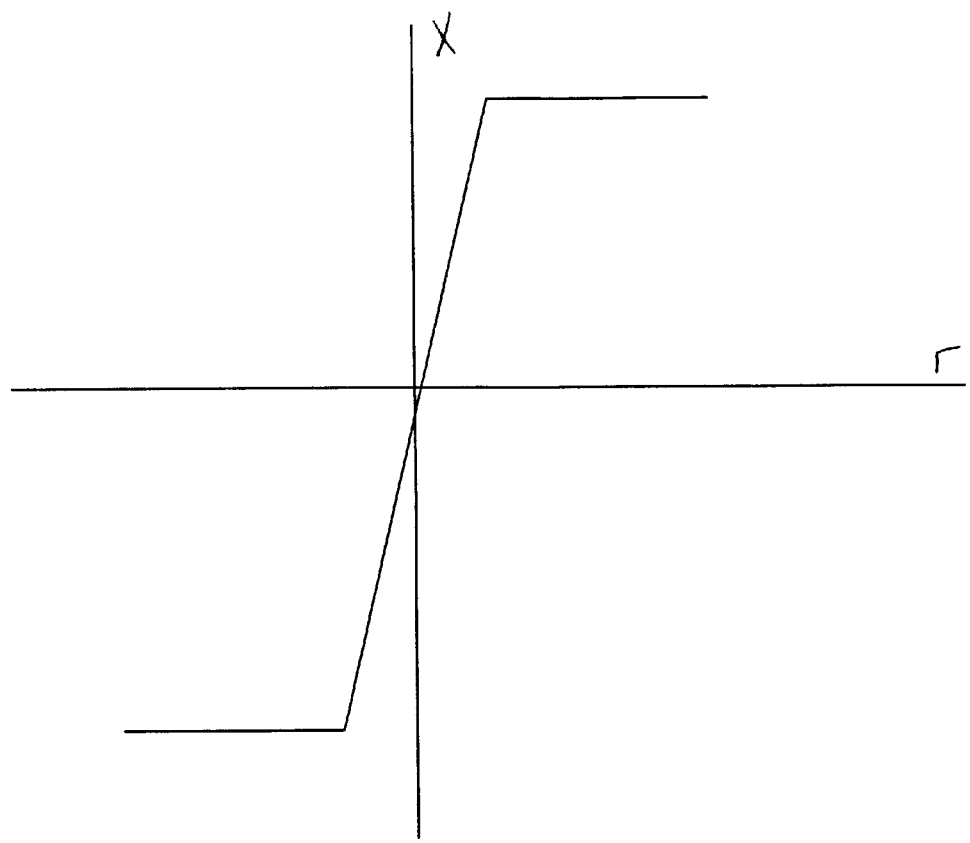
FIG. 4d is an illustration of a piece-wise linear function that can be used in an alternate embodiment.

The preferred embodiment uses the tanh function. However, other functions can also be used, e.g., other functions having an "S" shape. In an alternate embodiment a piece-wise linear function can be used, e.g., as shown in FIG. 4d.

The S-curves do not all have to be identical; one could attempt to decrease the number of curves by using curves that are different from each other. Also, if r0=0, symmetry can be exploited to remove the negatively indexed filters and instead, re-use the positively indexed filters.

The linear SISO 408 can be a copy of the h0 block illustrated-in FIG. 4c.

The K-model was tested using two circuits. The first test circuit was a model that demonstrated the need to include memory in the model. The second test circuit was a larger transistor-level model that demonstrated the need to include frequency-dependent gain compression (pole-zero movement).

Figure 5:
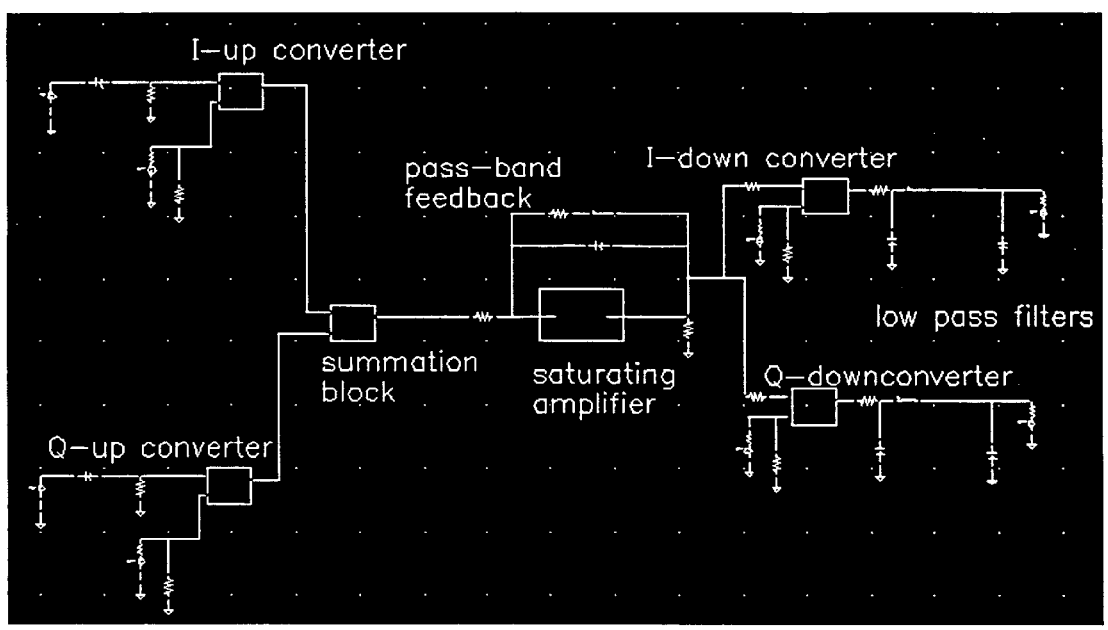
FIG. 5 is an illustration of the first circuit used to test the preferred embodiment of the present invention.

FIG. 5 is an illustration of the first circuit used to test the preferred embodiment of the present invention. The test circuit translates base-band inputs up to RF, e.g., 1 Ghz, passes them through a saturating pass-band active filter, then downconverts to base-band. The amplifier saturates at 10 volts when the input exceeds 1 volt. The band-width of the circuit is 70 Mhz and the carrier is 1 Ghz.

Figure 6:
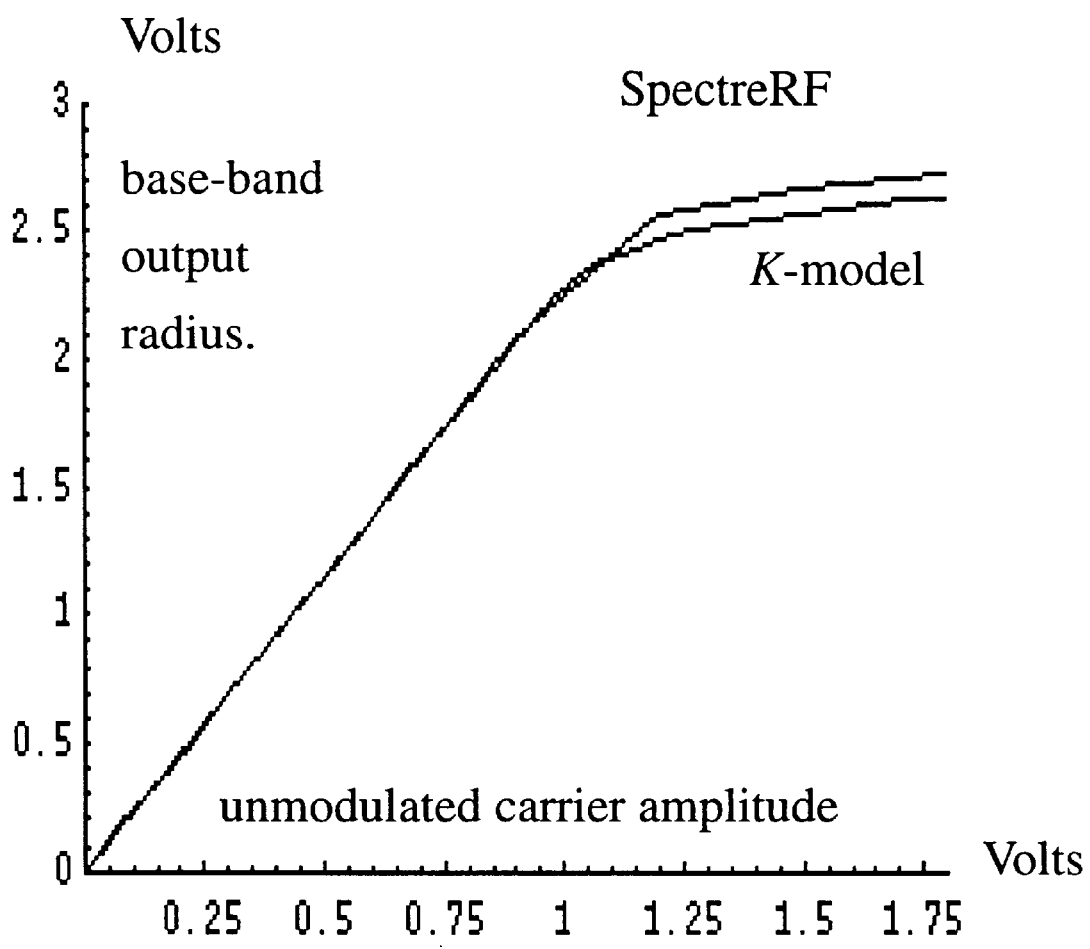
FIG. 6 is an illustration of the DC transfer curve, the relationship between base-band output radius and unmodulated input carrier amplitude resulting from the testing of the first circuit.

Recall, that "bias" refers to the amplitude of the unmodulated 1 Ghz carrier. The small-signal input, for which transfer functions are defined, is an infinitesimal modulation of the carrier amplitude. FIG. 6 is an illustration of the DC transfer curve, the relationship between base-band output radius and unmodulated input carrier amplitude resulting from the testing of the first circuit using the preferred embodiment of the present invention.

Figure 7:
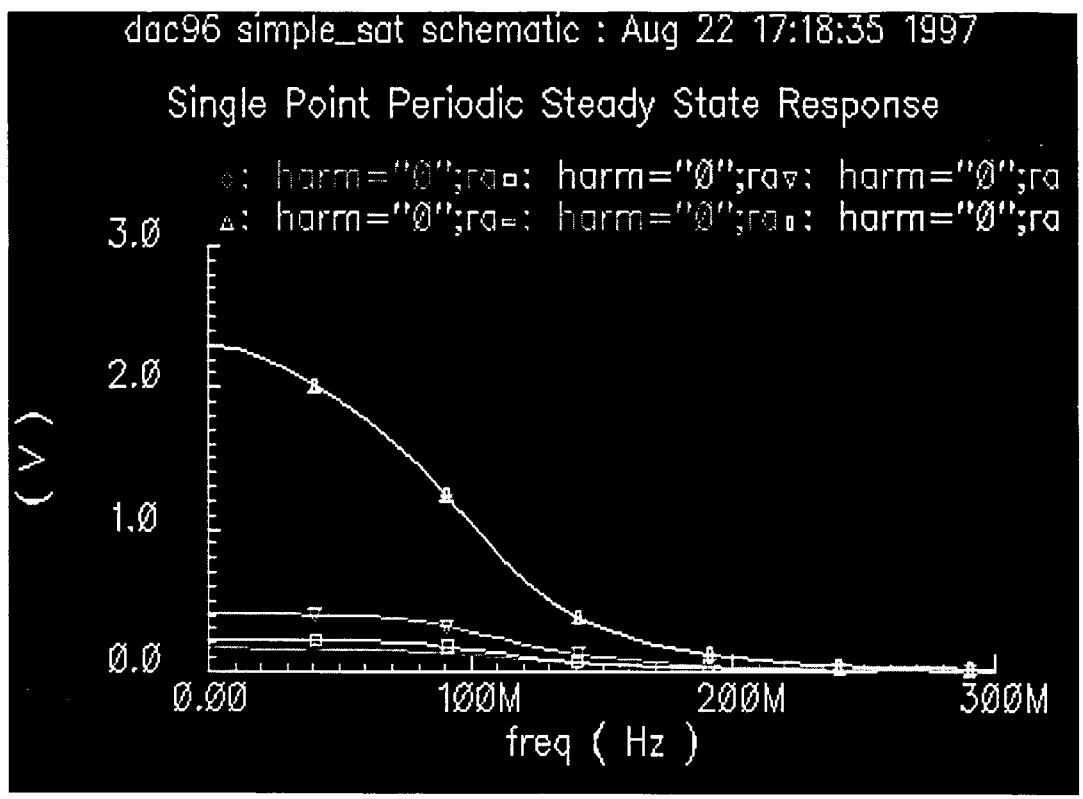
FIG. 7 is an illustration of the radial transfer functions extracted at several input biases resulting from the testing of the first circuit using the present invention.
Figure 8:
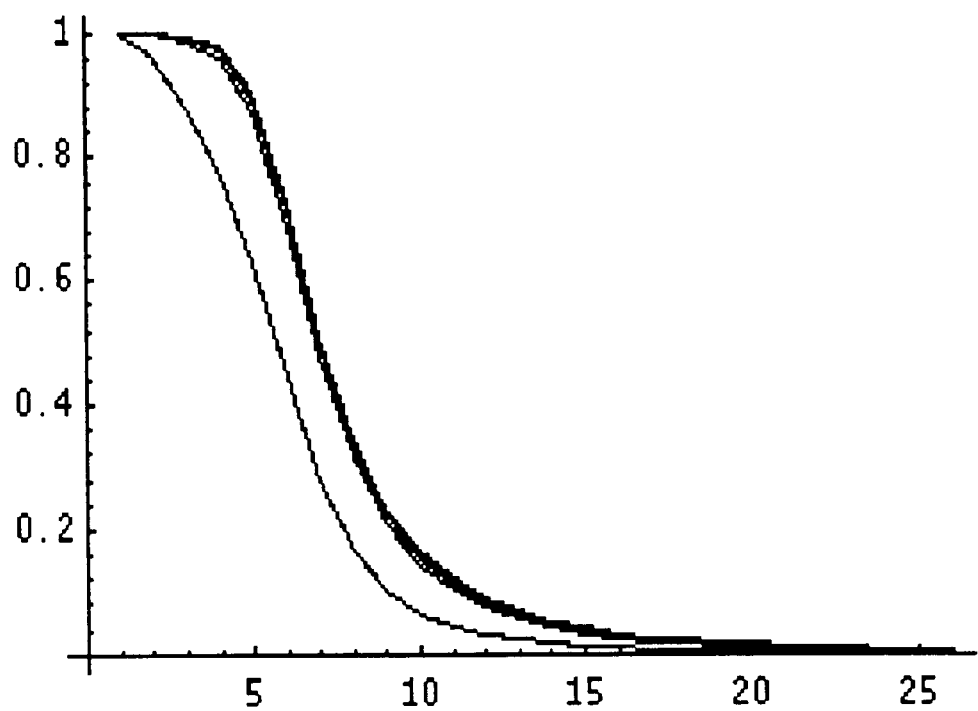
FIG. 8 is an illustration of the transfer functions normalized for unity DC gain according to the results of the testing of the first circuit using the present invention.

FIG. 7 is an illustration of the radial transfer functions (i.e. input-to output radius) extracted at several input biases resulting from the testing of the first circuit using the present invention. FIG. 7 shows gain compression. FIG. 8 is an illustration of the transfer functions normalized for unity DC gain according to the results of the testing of the first circuit using the present invention. FIG. 8 shows pole-zero movement since the normalized transfer functions do not all coincide.

We compared K-model simulations of the first test circuit to simulations performed using SpectreRF that is commercially available from Cadence Design Systems, Inc., San Jose, Calif. We used the a DSP tool, SPW (Signal Processing Workstation) which is commercially available from Cadence Design Systems, Inc., to run the K-model. We compared I–Q (i.e. in-phase versus quadrature) trajectories since the systems engineer may visualize distortion in terms of a symbol constellation, which lies in the I–Q plane. FIGS. 9a and 9b are illustrations comparing I–Q output trajectories for small and large in-band signals using SpectreRF model and the K-model of the present invention. The small signal SpectreRF and K-model responses coincide. The large signal K-model response is about 8 percent smaller than the SpectreRF response; if we were to scale the K-model's response by 1.08 the outer edges of the trajectories would coincide. The DC transfer curve starts to saturate at an input voltage of 1 volt. The combined base-band input signals produced a peak input signal of 1.82 volts.

Figure 11:
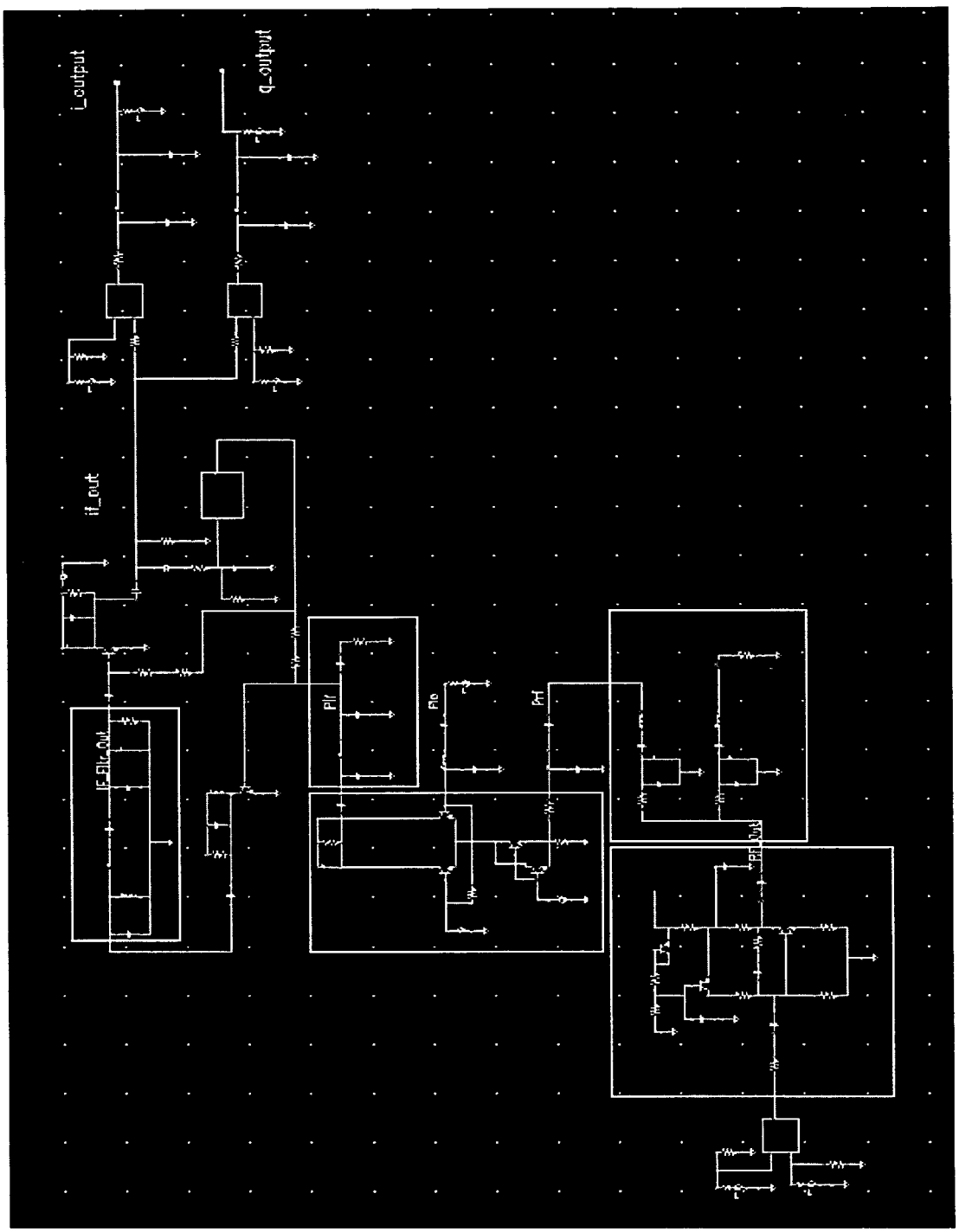
FIG. 11 is an illustration of an RF receiver used during a second test of the present invention.

FIGS. 10a and 10b are illustrations of the trajectories for small and large signals at higher frequencies, (inphase=70 Mhz and quadrature=150 Mhz) according to the present invention. Both input signals were 1 volt sinusoids, giving a combined peak base-band signal of 1.4 volts. The response is significantly better than a memoryless model. The aspect ratio of the overall response is much different than one because the response depends on frequency and the in-phase and quadrature inputs are of different frequencies. A memoryless model could not produce the correct aspect ratio because it would apply the same attenuation to both axes. A memoryless model would produce an aspect ratio of one A second test was also performed that compared K-model and SpectreRF simulations for a large transistor level model of an RF receiver. FIG. 11 is an illustration of an RF receiver used during a second test of the present invention.

Figure 12:
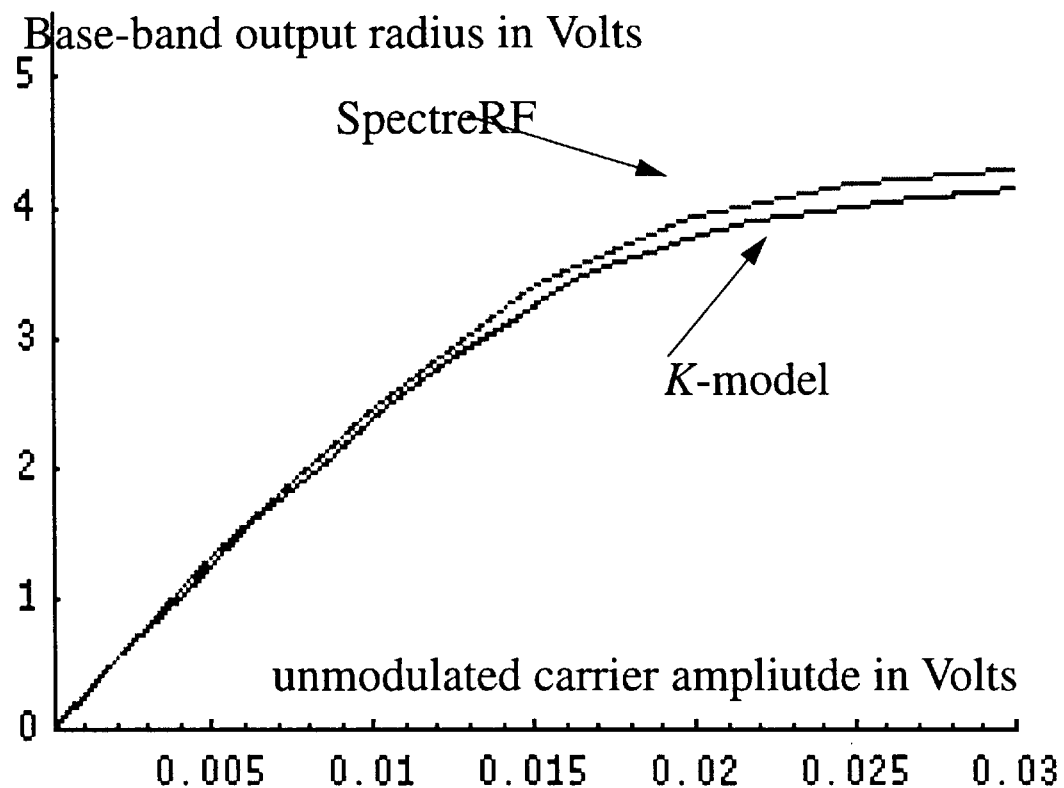
FIG. 12 is an illustration of the radial DC transfer curve using the second test circuit computed with SpectreRF and the K-model according to the preferred embodiment of the present invention.

FIG. 1 illustrates the radial transfer function at several input signal biases. Note the difference in gain compression at DC and 10 Mhz. The difference is due to amplitude-dependent poles and zeros. FIG. 12 is an illustration of the radial DC transfer curve using the second test circuit computed with SpectreRF and the K-model according to the present invention. The output is well into saturation when the unmodulated carrier exceeds 20 mv.

Figure 13:
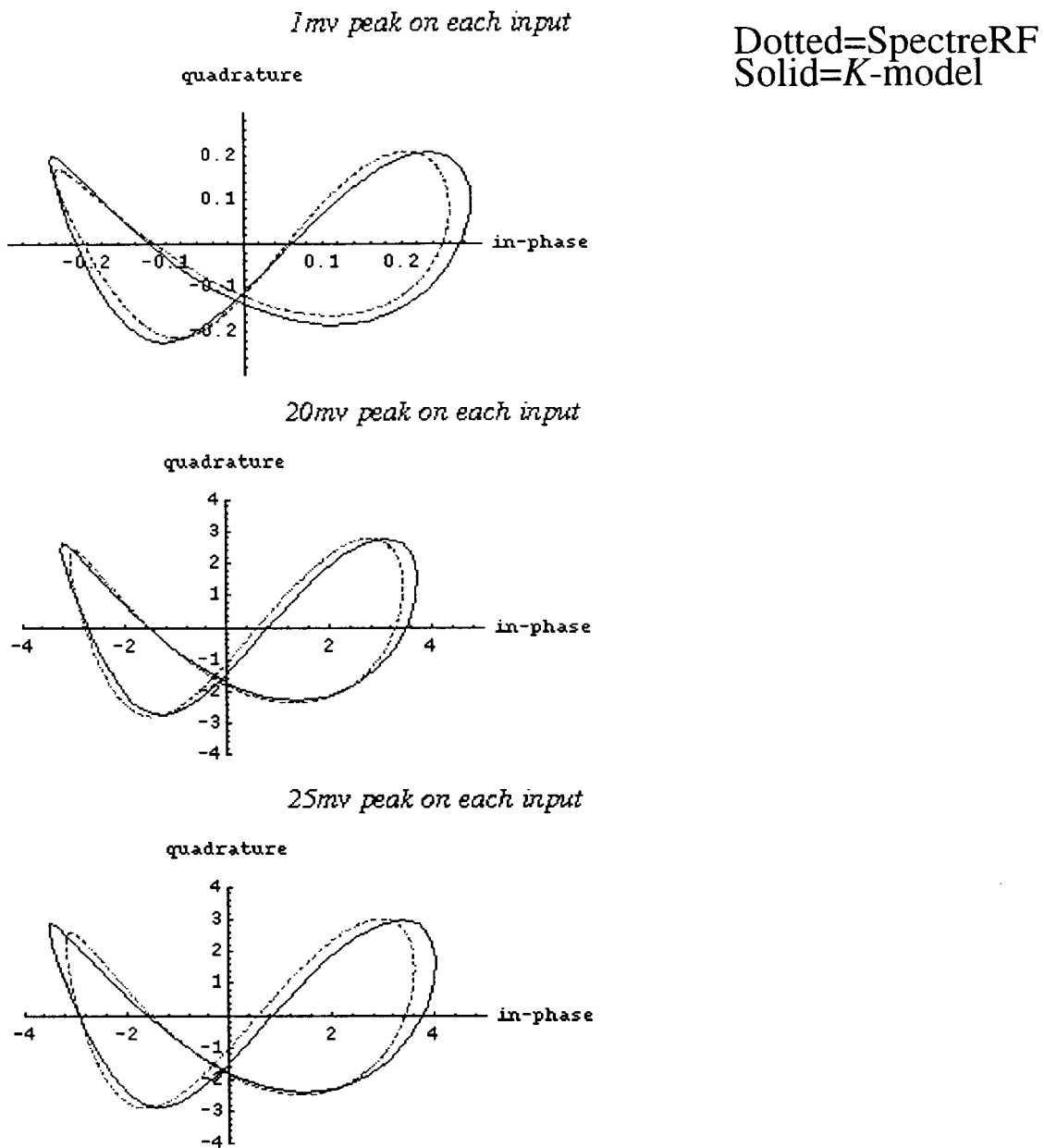
FIG. 13 is an illustration of a comparison of K-model and SpectreRF simulations for several input levels on the second test circuit according to the preferred embodiment of the present invention.

FIG. 13 is an illustration of a comparison of K-model and SpectreRF simulations for several input levels on the second test circuit according to the present invention. The input in-phase and quadrature signals were 5 Mhz and 10 Mhz respectively and of equal amplitude. The combined input signals gave peaks of 1.25 mv, 0.025 mv, and 30 mv. Based on the DC transfer curve the latter two input test signals were large. The error in the large signal response was on the order of 10 percent.

Trajectories from a cascade model did not significantly differ from those in FIG. 13. One might be tempted to use the cascade model. However, while it is important to simulate large signal swings it is also be important to simulate small perturbations about a large displacement. An I–Q trajectory may spiral into a constellation point instead of jumping right to it. The next test addresses the latter scenario.

Figure 14:
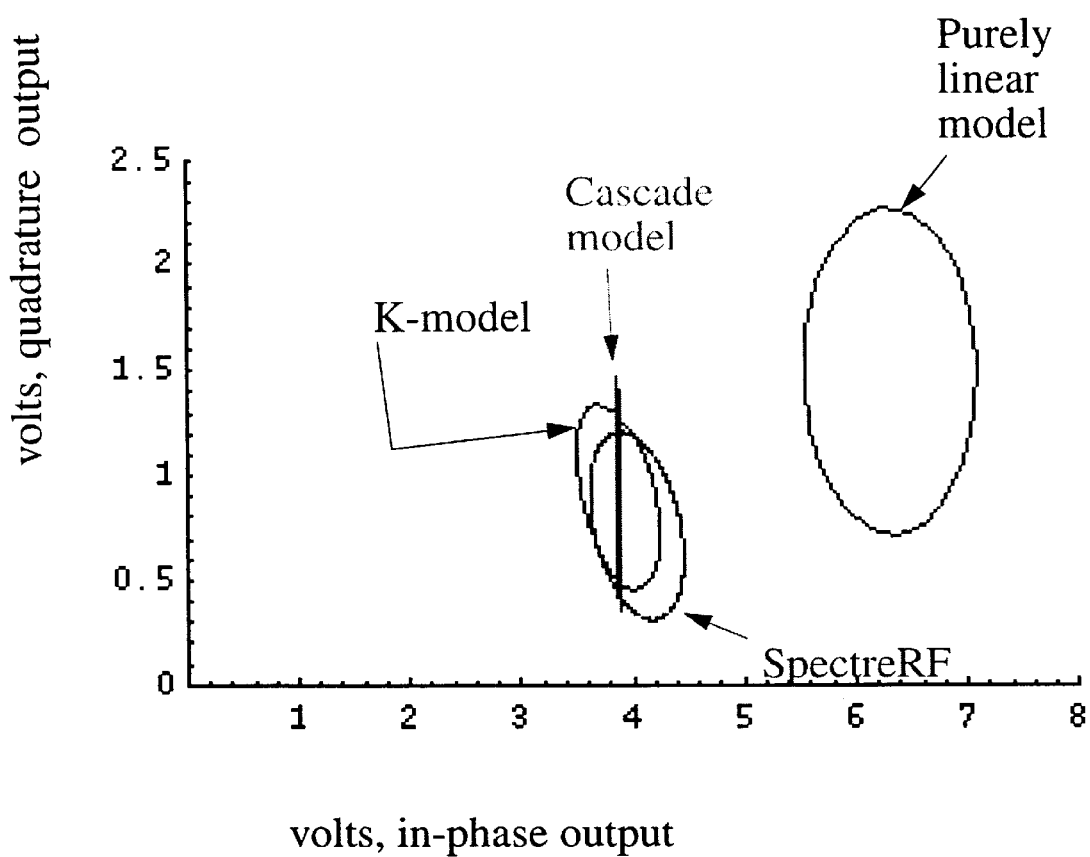
FIG. 14 is an illustration comparing simulations using SpectreRF, a linear model, a cascade model, and the K-model of the present invention.

FIG. 14 is an illustration comparing simulations using SpectreRF, a linear model, a cascade model, and the K-model of the present invention. For each simulation the input was a small constant amplitude sinusoid, 10 Mhz away from the carrier, added to a large unmodulated carrier. In the input complex plane the input signal traced out a small circle centered on the real axis and displaced from the origin. SpectreRF produced the lower oval. The uncorrected linear MIMO model within the K-model produced the largest trajectory in FIG. 14. Alone, the linear model is way off because it does not account for saturation. The complete K-model produced the upper oval. A cascade model produced the thin vertical trajectory. The cascade model in this example consisted of a memoryless non-linear multi-tanh structure followed by a normalized linear MIMO model. The memoryless multi-tanh structure used the same tanh curves used in the K-model but the associated slopes were just the DC values of the K-model's transfer functions. The memoryless multi-tanh structure operated only on radius. The resulting radius was combined with the input phase to convert back to rectangular coordinates and drive the linear MIMO model 406. The linear MIMO model 406 was the K-model's linear MIMO model normalized for a radial gain of one.

In the radial direction the cascade model does not account for the poles and zeros that depend on radius. In general, cascade models cannot simulate pole-zero movement because all filtering effects come from a single linear MIMO model. The non-linear part of the cascade model can scale the linear filter's response depending on bias but it can not move the poles and zeros. In contrast, the K-model can move the poles and zeros for bias.

The K-model is an improvement over linear models, memoryless non-linear models, and cascaded combinations of linear filters and memoryless non-linearities. Simulations of two different test circuits show the modeling error is about 10 percent for input excursions well into the saturation region of the DC transfer curve.

The first test circuit composed mostly of behavioral blocks implemented in analog hardware description language (AHDL) code. The second test circuit was composed of device models and used very little AHDL. Aside from validating the K-model, the two test circuits demonstrate that the K-model can be used to extract a system-level model from any mix of behavioral and device models Accordingly the K-model can be used during any phase of the receiver's design to see if the current design will work in the larger system.

As indicated above SPW was used to simulate the K-model. SPW read in transfer functions extracted using SpectreRF then applied an inverse fast fourier transform (IFFT) to compute impulse responses. To simulate a transfer function, SPW convolved the sampled input with the sampled impulse response. There are other ways to simulate the transfer functions. One could apply the FFT to chunks of input data, multiply the FFT by the transfer function, then apply an IFFT to return to the time domain. However, that approach does not work well in feedback loops because the output is delayed by the length of a data chunk. Another approach is to fit rational transfer functions to the measured transfer functions. The rational transfer functions can be decomposed into pole-residue forms which can then be simulated with recursive convolution one example of which is described in Lin and Kuh, *Transient Simulation of Lossy Interconnects Based on the Recursive Convolution Formulation,* 39 IEEE Trans. Circuits Syst. 11, pp 879–892 (1992) that is incorporated by reference herein in its entirety. Recursive convolution is very fast. The first step is to make sure the rational transfer function approach is as good as or better than the finite impulse response (FIR) filter approach.

Along with increased simulation speed the rational transfer function approach may enable the K-model to simulate very low frequency dynamics. The automatic gain control (AGC) loop for example introduces very low frequency dynamics. An FIR filter can not simulate transients lasting longer than the number of taps times the sample period. The rational transfer functions would be implemented as IIR filters, which can have transients of arbitrary duration.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A system for modeling an output signal produced by mixed analog and digital circuitry in a digital signal design environment that provides an input signal, the input and output coordinates and the input and output signals having a radial component and an angular component when represented in polar coordinates, the system comprising:
    a non-linear static angular correction unit, disposed to receive the input signal, for rotating the input signal to generate a rotated signal;
    a first linear filter, disposed to receive the rotated signal, to linearly filter said rotated signal to generate a filtered rotated signal;
    a non-linear dynamic radial correction unit comprising:
        a second linear filter, disposed to receive said radial component of the input signal, to linearly filter said radial component of the input signal and to generate a first radial correction component;
        a non-linear filter, disposed to receive said radial component of the input signal, to generate a second radial correction component;
        a radial correction factor unit, comprising a signal divider and disposed to receive said first and second radial correction components, to determine a radial correction factor based upon said first and second radial correction components; and
        a correction unit, for integrating said radial correction factor and said filtered rotated signal to model said output signal.

2. The system of claim 1, wherein said correction unit integrates said radial correction factor and said filtered rotated signal by multiplying together said radial correction factor and said filtered rotated signal.

3. The system of claim 1, wherein said a non-linear static angular correction unit uses said radial component of the input signal to determine a rotation for said rotated signal.

4. The system of claim 1, wherein said non-linear filter generates said second radial correction component using approximately S-shaped basis functions.

5. The system of claim 4, wherein said approximately S-shaped basis functions comprise hyperbolic tangent functions.

6. A method of modeling an output signal produced by mixed analog and digital circuitry as part of a digital signal design that provides an input signal, the input and output signals having an in-phase component and a quadrature component when represented in rectangular coordinates and the input and output signals having a radial component and an angular component when represented in polar coordinates, the method comprising the steps of:
    (a) rotating and linearly filtering the input signal to generate a filtered rotated signal;
    (b) linearly filtering said radial component of the input signal to generate a first radial correction component;
    (c) non-linearly filtering said radial component of the input signal to generate a second radial correction component;
    (d) determining a radial correction factor based upon said first and second radial correction components; and
    (e) integrating said radial correction factor and said filtered rotated signal to model said output signal.

7. The method of claim 6, wherein step (d) is performed by dividing said second radial correction component by said first radial correction component.

8. The method of claim 6, wherein step (e) is performed by multiplying together said radial correction factor and said filtered rotated signal.

9. The method of claim 6, wherein the input signal is rotated using said radial component of the input signal to determine a rotation for said rotated signal.

10. The method of claim 6, wherein step (c) is performed using approximately S-shaped basis functions.

11. The method of claim 10, wherein said approximately S-shaped basis functions comprise hyperbolic tangent functions.

12. The method of claim 6 further comprising the steps of:
    (f) converting the model of said output signal into a transfer function represented by a set of data points;
    (g) instantiating the transfer function into the digital signal design; and
    (h) simulating the digital signal design.

13. A computer-assisted method of modeling an output signal produced by mixed analog and digital circuitry as part of a digital signal design that provides an input signal, the input and output signals having an in-phase component and a quadrature component when represented in rectangular coordinates and the input and output signals having a radial component and an angular component when represented in polar coordinates, the method comprising the steps of:
    (a) rotating and linearly filtering the input signal to generate a filtered rotated signal;
    (b) linearly filtering said radial component of the input signal to generate a first radial correction component;
    (c) non-linearly filtering said radial component of the input signal to generate a second radial correction component;
    (d) determining a radial correction factor based upon said first and second radial correction components; and
    (e) integrating said radial correction factor and said filtered rotated signal into a model of said output signal.

14. The method of claim 13, wherein step (d) is performed by dividing said second radial correction component by said first radial correction component.

15. The method of claim 13, wherein step (e) is performed by multiplying together said radial correction factor and said filtered rotated signal.

16. The method of claim 13, wherein the input signal is rotated using said radial component of the input signal to determine a rotation for said rotated signal.

17. The method of claim 13, wherein step (c) is performed using approximately S-shaped basis functions.

18. The method of claim 17, wherein said approximately S-shaped basis functions comprise hyperbolic tangent functions.

19. The method of claim 13 further comprising the steps of:

(f) converting the model of said output signal into a transfer function represented by a set of data points;

(g) instantiating the transfer function into the digital signal design; and (h) simulating the digital signal design.

* * * * *